United States Patent [19]

Morita et al.

[11] Patent Number: 4,814,576
[45] Date of Patent: Mar. 21, 1989

[54] MACHINING AND ASSEMBLING SYSTEM USING LASER BEAM

[75] Inventors: Takeshi Morita; Masaharu Moriyasu; Megumi Ohmine, all of Hyogo, Japan

[73] Assignee: Mitsubishi Denki Kabushiki Kaisha, Tokyo, Japan

[21] Appl. No.: 137,709

[22] Filed: Dec. 24, 1987

[30] Foreign Application Priority Data

Dec. 26, 1986 [JP] Japan ................... 61-308383

[51] Int. Cl.$^4$ .............................. B23K 26/00
[52] U.S. Cl. .................. 219/121.6; 219/121.12
[58] Field of Search ..... 219/121 L, 121 LM, 121 EB, 219/121 EM, 121 LC, 121 LD, 121 LG, 121 LN, 121 LS, 121 LT, 121 LU, 121 ED, 121 EC, 121 LV, 121.6, 121.85, 121.79, 121.12, 121.38, 121.78, 121.77, 121.76, 121.63, 121.64, 121.67, 121.72

[56] References Cited

U.S. PATENT DOCUMENTS

| | | | |
|---|---|---|---|
| 4,176,271 | 11/1979 | Terai et al. | 219/121 ED |
| 4,205,216 | 5/1980 | Douglas | 219/121 LD |
| 4,555,610 | 11/1985 | Polad et al. | 219/121 LV |

Primary Examiner—C. L. Albritton
Attorney, Agent, or Firm—Sughrue, Mion, Zinn, Macpeak and Seas

[57] ABSTRACT

A laser machining and assembling apparatus comprises a plurality of different laser oscillators, laser beam transmission means for transmitting laser beams from the laser oscillators, a plurality of machining and assembling cells each including a laser machining center for laser maching and assembling workpieces, a machining center for mechanically machining the workpieces to desired configurations, and in-cell transportation robot for transporting the workpieces between the laser machining center, the machining center and a depository of the workpieces, an assembling robot for assembling the workpieces and a controller for controlling operations of the laser machining center, the machining center, the in-cell transportation robot and the assembling robot, inter-cell transportation robot means for transporting the workpieces between the machining and assembling cells and a system controller for controlling operations of the laser oscillators, the machining and assembling cells and the inter-cell transportation robot.

9 Claims, 3 Drawing Sheets

MACHINING AND ASSEMBLING SYSTEM USING LASER BEAM

BACKGROUND OF THE INVENTION

The present invention relates to a machining and assembling apparatus with using laser beams.

FIG. 1 shows a construction of an example of a conventional laser machining apparatus which is disclosed in the joint reasearch and development report in "Composite Manufacturing System using Super High Peformance Laser", Large Scale Project sponsored by Agency of Industrial Science and Technology of Japan. In FIG. 1, a reference numeral 1 depicts a $CO_2$ laser oscillator having an output power of 10 KW, 2 a console of the laser oscillator 1, 3 a 5 KW laser machining mechanism which is provided a welding head and a tempering head, 4 a control device for the welding head, 5 a control device for the tempering head and 6 a 10 KW laser machining mechanism. Reference numerals 7 and 8 depict a control panel and a console of the laser machining mechanism 6. A reference numeral 9 depicts a laser machining managing device for managing the laser machining apparatus totally, 10 a center post having a switch mechanism for switching laser beam produced by the laser oscillator 1 between the laser machining mechanisms 3 and 6 and 11 an optical path control device responsive to a control signal from the laser machining managing device 9 for controlling the center post 10. Laser beam transmission paths are depicted by 3a and 6a.

In the conventional laser machining apparatus constructed as above, laser beam derived from the $CO_2$ laser oscillator 1 is branched at the center post 10 and transmitted through the optical paths 3a and 6a to the laser machining mechanisms 3 and 6 in time sharing manner to realize time shared welding and tempering of a workpiece, so that the workpiece can be welded and tempered successively. Therefore, when it is desired to further machine the workpiece, for example, to cut it, another machine which as a laser oscillator having output power enough to cut it has to be prepared. An example of such laser oscillator may be a $TEM_{oo}$ mode laser whose output power is as small as 1 KW and whose laser condensing performance is excellent.

FIG. 2 shows an example of a conventional machining and assembling apparatus using such laser machining apparatus as above, in which reference numerals 40, 41 and 42 depict different laser oscillators. In this example, the laser oscillator 40 is a single mode $CO_2$ pulse laser oscillator, the laser oscillator 41 is a medial power, multi-mode $CO_2$ laser oscillator and the laser oscillator 42 is a high power $CO_2$ laser oscillator. A reference numeral 43 depicts a cutting station, 44 a welding station and 45 a heat treatment station.

The laser oscillator 40 and the cutting station 43 constitute a laser machining station, and second and third machining stations are constituted with the laser oscillator 41 and the welding station 44 and the laser oscillator 42 and the heat treatment station 5, respectively. In FIG. 2, reference numerals 46a and 46b depict assembling apparata, respectively, and 47a and 47b machining centers, respectively. Reference numerals 48, 49 and 50 show a machining process to be performed in the machining station constituted with the machining centers 47a, 47b and 47c, a laser machining process to be performed in the laser machining stations and an assembling process to be performed in the assembling apparatua 46a and 46b, respectively.

In the conventional machining and assembling apparatus using laser beam, a workpiece is supplied to the machining process 48, the laser machining process 49 or the assembling process 50 and, after a desired operation in a desired one of the processes completes, it is transported to another process and so on. After a final assembling operation, the workpiece is totally checked.

As mentioned above, in the conventional apparatus, the machining process, the laser machining process and the assembling process are discretely provided and a workpiece is transported between these processes. Alternatively, it is possible to transport the workpiece continuously by means of a belt-conveyer.

That is, since, in the machining and assembling apparatus using the conventional laser machining apparatus constructed as shown in FIG. 1, in which laser beam derived from a single laser oscillator is branched on demand to perform a welding or tempering of a workpiece, another laser oscillator is necessary when other machining such as cutting of workpiece is to be performed. Therefore, as shown in FIG. 2, the workpiece has to be transported along a complicated path extending between the respective machining stations and, in order to weld or temper the workpiece after cutting, it is necessary to transport it to the respective laser machining stations.

In the conventional apparatus which employs the continuous transportation system and has two different welding steps, the corresponding number of the laser machining stations must be provided, causing a line construction to be high cost.

SUMMARY OF THE INVENTION

An object of the present invention is to provide a laser machining and assembling apparatus including a plurality of cells each having a laser machining center, a machining center, a internal transportation robot, an assembling robot and a controller, an inter-cell transportation robot, a system controller and a laser beam transmission pipe means having a mechanism for supplying laser beam from an arbitrarily selected one of laser oscillators to an arbitrarily selected one of the laser machining stations to perform a machining and assembling of workpieces in each as a unit.

DETAILED DESCRIPTION OF THE PREFERRED EMBODIMENT

Figure 1:
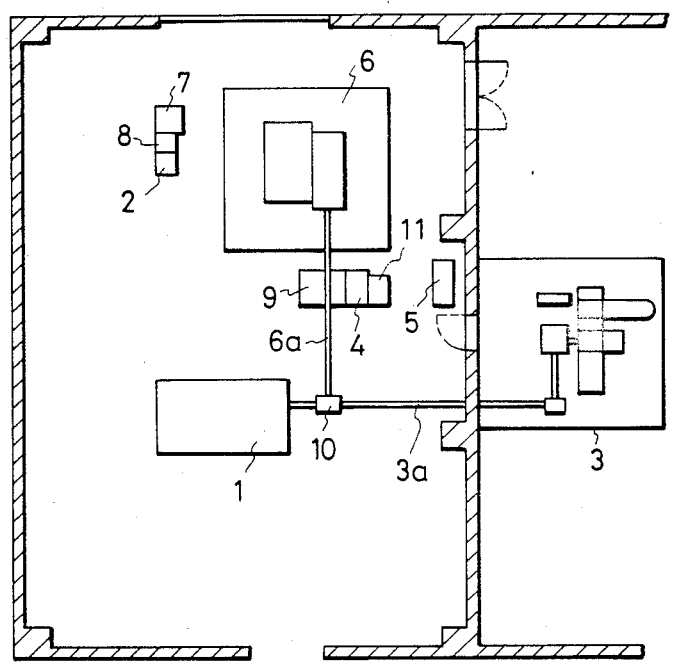
FIG. 1 shows a construction of an example of a conventional laser machining apparatus.
Figure 2:
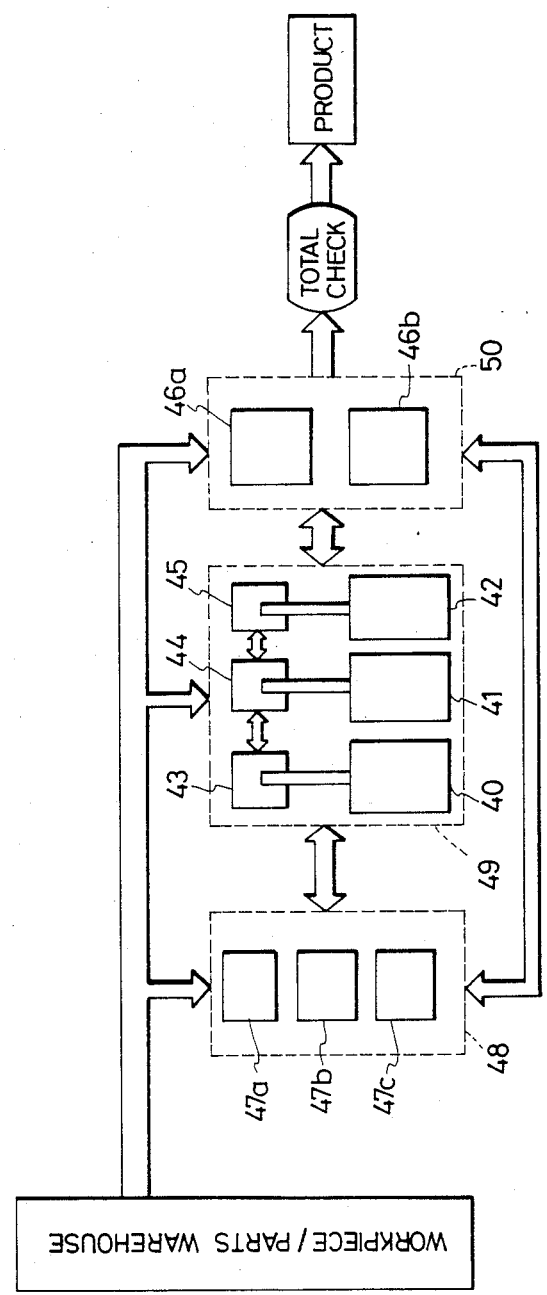
FIG. 2 shows a construction of an example of a conventional laser machining and assembling apparatus using the laser machining apparatus shown in FIG. 1.
Figure 3:
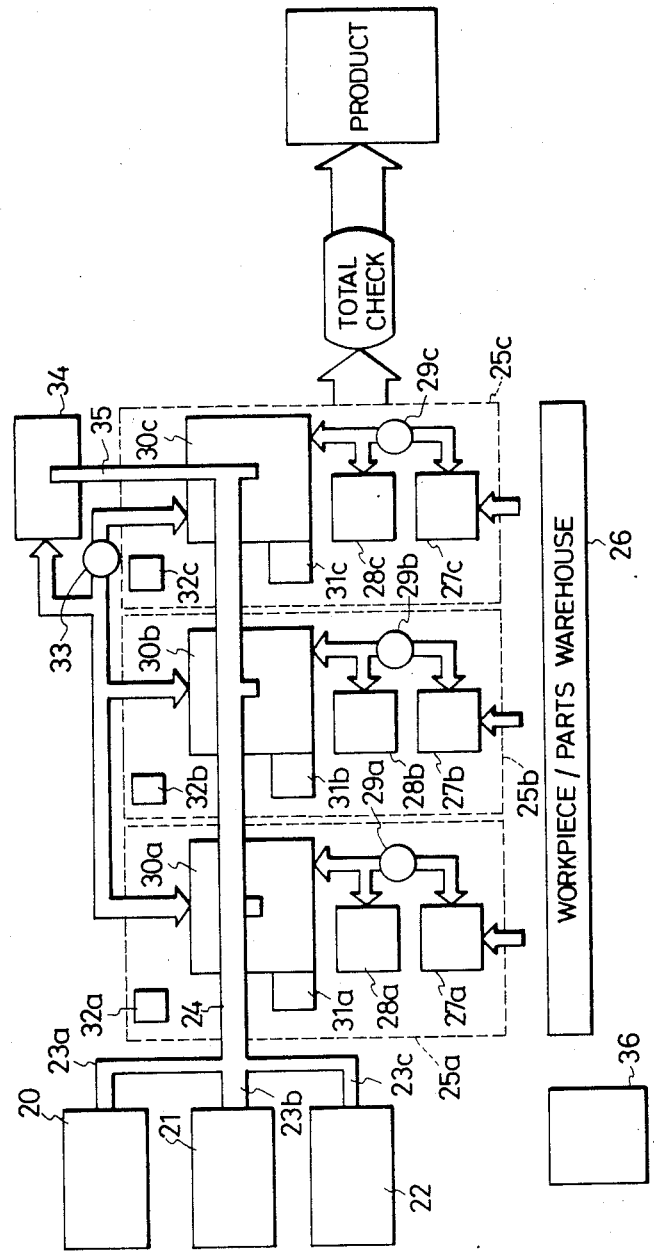
FIG. 3 shows a construction of an embodiment of the present laser machining and assembling apparatus.

In FIG. 3 which illustrates an embodiment of the present invention, a reference numeral 20 depicts a $CO_2$ pulse laser oscillator, 21 a high power $CO_2$ laser oscillator and 22 a YAG laser oscillator. Reference numerals 23a, 23b and 23c depict laser beam transmission pipes for transmitting laser beams from the laser oscillators 20, 21 and 22, respectively, which are coupled to a common laser beam transmission pipe 24. A laser beam converter for switching laser beam is privided at each of junctions between the common laser beam transmission pipe 24 and the laser beam transmission pipes 23a, 23b and 23c, although not shown in FIG. 3.

Reference numerals 25a, 25b and 25c depict machining cells, respectively, and laser machining centers provided in the respective machining and assembling cells 25a, 25b and 25c for maching workpieces with laser beam and assembling them are depicted by reference numerals 30a, 30b and 30c, respectively. The laser machining centers 30a, 30b and 30c are coupled to the common laser beam transmission pipe 24 mutually.

Workpieces to be machined, heat-treated and/or assembled are deposited in deposite portions 27a, 27b and 27c. Machining centers are depicted by reference numerals 28a, 28b and 28c and inter-cell transportation robots for transporting workpieces within each cell are depicted by reference numerals 29a, 29b and 29c. Assembling robots 31a, 31b and 31c for assembling parts and handling them in the laser machining centers 30a, 30b and 30c are provided in the machining and assembling cells 25a, 25b and 25c, respectively.

Self-controllers 32a, 32b and 32c are provided in the respective machining and assembling cells 25a, 25b, and 25c for controlling operations of the machining centers 28a, 28b and 28c, the transportation robots 29a, 29b and 29c, the laser machining centers 30a, 30b and 30c and the assembling robots 31a, 31b and 31c, respectively.

A reference numeral 33 depicts an inter-cell transportation robot for transporting parts machined or assembled in the respective machining and assembling cells 25a, 25b and 25c therebetween. An off-cell laser machining center 34 is provided independently from the machining and assembling cells 25a, 25b and 25c and a beam transmission pipe 35 connects the off-cell laser machining center 34 to the common laser beam transmission pipe 24. A reference numeral 36 depicts a system controller for controlling operations of the laser oscillators 20, 21 and 22, the machining and assembling cells 25a, 25b and 25c and the inter-cell transportation robot 33.

Now, an operation of the embodiment of the present invention constructed as above mentioned will be described. The workpieces or parts are transported from respective warehouses to the depositories 27 of the respective cells 25a, 25b and 25c on demand and the in-cell transportation robots 29a, 29b and 29c transport them to the machining centers 28a, 28b and 28c or the laser machining centers 30a, 30b and 30c. In the machining centers 28a, 28b and 28c, the workpieces or parts are mechanically machined to predetermined configurations. In the laser machining centers 30a, 30b and 30, after informations of the workpiece are set, the workpiece is irradiated with a required laser beam or beams to perform a laser machining.

The wokpiece mechanically or laser machined is assembled by the assembling robots 31a, 31b and 31c, if necessary. In the latter case, the self-controllers 32a, 32b and 32c control the machining operations and operations of the transportation robots 29a, 29b and 29c.

In some case, the workpiece machined and assembled in one of the cells 25a, 25b and 25c is transported again to any of the cells in which it is further assembled to another part.

The operation in each of the laser machining cells 30a, 30b and 30c is not limited to a single machining. There may be a case in which a workpiece is cut by laser beam from the $CO_2$ pulse laser and then welded and heat treated by the high power $CO_2$ laser beam, or, thereafter, further marked by laser beam from the YAG laser, in one of the laser machining cells.

The descretely provided off-cell laser machining center 34 is for a special purpose such as a laser welding of a workpiece in a reduced pressure environment.

As described hereinbefore, according to the present invention, laser beams from a plurality of different laser oscillators are transmitted to a plurality of machining cells each including a laser machining center, a machining center, a transportation robot, an assembling robot and a controller therefor Therefore, laser oscillators can be utilized efficiently regardless of machining method, kind and quantity of workpieces to be machined.

Describing a manufacturing process of an induction motor, which utilizes the present system, as an example, with reference to FIG. 3, a casing of the induction motor may be manufactured by the cell 25a, a stator thereof may be manufactured in the cell 25b and a shaft thereof may be manufactured in the cell 25c. An assembling of these components of the induction motor may also be performed in the cell 25c.

In the cell 25a, materials and parts necessary to manufacture the casing are derived from the warehouse 26 and stocked in the depositor 27a. Similarly, those necessary to manufacture the stator and the shaft are derived from the warehouse 26 and stocked in the depositories 27b and 27c, respectively.

In the cell 25a, brackets and bearings machined in the mechanical machining center 28a are transported to the laser machining center 34 in which they are supported by the assembling robot and welded together by the pulsed $CO_2$ laser having a rated output power of 500 W. And then, an end cover is welded to a shaft casing cover by a high power $CO_2$ laser oscillator having a rated output power of 5000 W. Thus, the casing is assembled while being machined. In the cell 25b, a collugated fin is formed around a stator armature by a pulsed $CO_2$ laser and then end portions of the collugation are cut by the same laser. Thereafter, the collugated fin is welded to the stator armature by a high power $CO_2$ laser.

In the cell 25c, drilling, tempering and welding operations are performed by switching between various laser beams to assemble the shaft. The casing and the stator manufactured in the respective cells 25a and 25b are transported to the cell 25c for a final assembling. Thereafter, markings of such as manufacturing number, type etc. of the motor are performed to a name plate thereof and then the motor is checked to make it as a final product.

What is claimed is:

1. A laser machining and assembling apparatus, comprising: a plurality of different laser oscillators, laser beam transmission means for transmitting laser beams from said laser oscillators, a plurality of machining and assembling cells each including a laser machining center, for laser maching and assembling workpieces, a machining center for mechanically machining the workpieces to desired configuration, an in-cell transportation robot for transporting the workpieces between said laser machining center, said machining center and a depository of the workpieces, an assembling robot for assembling the workpieces, a controller for controlling operations of said laser machining center, said machining center, said in-cell transportation robot and said assembling robot, inter-cell transportation robot means for transporting the workpieces between said machining and assembling cells, and a system controller for controlling operations of said laser oscillators, said machining and assembling cells and said inter-cell transportation robot.

2. The laser machining and assembling apparatus as claimed in claim 1, wherein said laser beam transmission means includes a mechanism for supplying a laser beam from any one of said laser oscillators to any of said laser machining centers.

3. The laser machining apparatus as claimed in claim 1 or 2, further comprising a check mechanism provided in each of said machining and assembling cells, for checking the workpieces.

4. The laser machining apparatus as claimed in claims 1 or 2, further comprising an off-cell laser machining center.

5. The laser machining apparatus as claimed in claim 4, wherein said off-cell laser machining center includes a high energy density beam machining mechanism.

6. The laser machining apparatus as claimed in claim 5, wherein said high energy density beam is laser beam.

7. The laser machining apparatus as claimed in claim 6, wherein said high energy density beam is electron beam.

8. The laser machining apparatus as claimed in claims 1 or 2, wherein said different laser oscillators have at least two different wavelengths.

9. The laser machining apparatus as claimed claim 1 or 2, wherein said laser oscillators have at least two different beam modes.

* * * * *